(12) United States Patent
Couck

(10) Patent No.: US 8,191,789 B2
(45) Date of Patent: Jun. 5, 2012

(54) FLEX TOKEN WITH EMBOSSED KEY PROTECTION

(75) Inventor: Guy Louis Couck, Denderleeuw (BE)

(73) Assignee: Vasco Data Security, Inc., Oakbrook Terrace, IL (US)

( * ) Notice: Subject to any disclaimer, the term of this patent is extended or adjusted under 35 U.S.C. 154(b) by 636 days.

(21) Appl. No.: 12/339,636

(22) Filed: Dec. 19, 2008

(65) Prior Publication Data

US 2010/0140360 A1    Jun. 10, 2010

Related U.S. Application Data

(63) Continuation-in-part of application No. 12/330,895, filed on Dec. 9, 2008, now Pat. No. 8,136,736.

(51) Int. Cl.
*G06K 19/06* (2006.01)

(52) U.S. Cl. ....................................... 235/492

(58) Field of Classification Search ................. 235/380, 235/492, 487; 29/622; 200/293
See application file for complete search history.

(56) References Cited

U.S. PATENT DOCUMENTS

| | | | |
|---|---|---|---|
| 4,100,011 A | 7/1978 | Foote | |
| 4,686,898 A | 8/1987 | LaManna et al. | |
| 6,776,332 B2 * | 8/2004 | Allen et al. | 235/380 |
| 2001/0030238 A1 | 10/2001 | Arisawa | |
| 2007/0267506 A1 | 11/2007 | Bashan et al. | |
| 2008/0203171 A1 | 8/2008 | Phillips | |
| 2008/0271980 A1 * | 11/2008 | Seo | 200/293 |
| 2008/0277484 A1 | 11/2008 | Launay et al. | |

FOREIGN PATENT DOCUMENTS

WO     WO-2008/129193     10/2008

OTHER PUBLICATIONS

DIGIPASS PRO 250 Product sheet, Vasco Data Security International, retrieved from http://www.vasco.com/documents/literature/pdf/DP_PRO250.pdf, 2002.

* cited by examiner

*Primary Examiner* — Seung Lee
(74) *Attorney, Agent, or Firm* — RatnerPrestia

(57) ABSTRACT

The present invention relates to the field of pocket-size electronic devices, including credit card sized devices such as authentication tokens. It consists of an improvement of the well-known "raised ridge" to protect individual buttons from false key presses, obtained by applying embossing. A known problem with applying embossing to cards containing electronic components, is the fact that the embossing process may damage the components or the wiring inside the card. In the process according to the invention, an embossed ridge of a judiciously designed shape is used to avoid such damage.

26 Claims, 4 Drawing Sheets

FLEX TOKEN WITH EMBOSSED KEY PROTECTION

TECHNICAL FIELD

The present invention relates to the field of pocket-size electronic devices, including credit card sized devices such as authentication tokens.

RELATED APPLICATIONS

The present application claims the benefit of the earlier filing date of U.S. patent application Ser. No. 12/330,895, filed on Dec. 9, 2008, the entirety of which is incorporated by this reference.

BACKGROUND ART

Embossing is a well-known technique to permanently mark plastic cards, such as credit cards, with alphanumerical characters and other symbols. It is typically applied at the end of the card production process, which includes laminating, under pressure and at high temperature, one or more layers of plastic onto a core sheet molded from an appropriate material such as the plastic resin polyvinyl chloride acetate (PVCA). One such process is disclosed in great detail in U.S. Pat. No. 4,100,011 [U.S. Pat. No. 4,100,011 B (FOOTE) 1978, Jul. 11].

The embossed text appearing on credit cards can be used to mechanically transfer the relevant card information onto a piece of carbon paper. Before the advent of electronic information carriers such as magnetized stripes and embedded integrated circuits on credit cards, the mechanical reproduction of embossed text on carbon paper and subsequent signing of the paper was the most common way to carry out credit card transactions. Although only a minority of today's credit card transactions still rely on the embossed text, embossing is still perceived by some as a security feature, as it adds a degree of difficulty to the process of counterfeiting credit cards.

Embossing is a mechanical process in which a "male" stamp of a character is punched into the rear side of the plastic card, while a "female" die is pushed against the front side. Machines for high-speed and high-precision embossing of plastic cards are known in the art, such as the one disclosed by LaManna et al. in U.S. Pat. No. 4,686,898 [U.S. Pat. No. 4,686,898 B (LAMANNA ET AL.) 1987, Aug. 18].

Embossing causes local permanent deformation of the material out of which the card is produced. Plastics are very amenable to this purpose. Modern credit cards or credit card sized devices, however, may include the functions of a contactless chip card or an authentication token, implemented by means of electronic components and wiring which would be damaged if subjected to the embossing process.

For example, the sensitivity of the wiring making up the antenna of a contactless smart card is recognized in the art, a fact that has prompted inventions such as those disclosed in [US 20010030238 A (ARISAWA) 2001, Oct. 18], [US 20080277484 A (LAUNAY ET AL.) 2008, Nov. 13], [US 20080203171 A (PHILIPS) 2008, Aug. 28], and [US 20070267506 A (BASHAN ET AL.) 2007, Nov. 22], which rely on avoiding overlap between the antenna wiring and the reserved embossing area.

More generally, the electronic devices to which the present invention applies comprise a processing device for carrying out an action, a button for initiating said action, and the necessary interconnection between these elements.

In this application, "slim electronic devices" or "slim electronic apparatus" refers to devices or apparatus with a thickness similar to that of a credit card. In this application, "credit card size" refers to the standardized size of ID-1 cards according to ISO/IEC standard 7810. Additional specifications for the size and finishing of such cards can be found in ISO/IEC standards 7811 and 7813.

By adding appropriate elements such as an agent for generating client credentials and a display, a credit card sized authentication token can be obtained. The function of an authentication token is to electronically generate authentication credentials, also known as one-time passwords, by cryptographically combining a key with at least one of a counter value, a time value, or data entered by the user.

In order to perform authentication, it is essential that the central authentication infrastructure disposes of an equivalent copy of the counter, the time value, or the entered data. Depending on the details of the cryptographic functions used, the central authentication infrastructure either uses this copy to generate a local instance of the client credential for comparison with the received client credential, or it extracts the value of the variable from the received client credential and compares that value with the central copy.

DISCLOSURE OF THE INVENTION

Technical Problem

A credit card sized device has the advantage that it is small and thin enough to be carried around in a wallet. It is therefore advantageous to implement electronic devices by embedding them in credit card sized plastic cards. In that way the user can always have the device at hand, if she so desires, and, in the case of an authentication token, conduct electronically authenticated transactions anywhere she goes. This also allows using established low-cost standard manufacturing techniques used in the production of credit card sized plastic cards.

Buttons on devices that fit into a pocket or a wallet, including credit card sized authentication tokens, tend to undergo false key presses when the device is put under mechanical stress such as bending, twisting or squeezing, or, more generally, exposed to environmental conditions that trigger the activation mechanism of the device. The problem is well known in the area of mobile telephones, where false keypresses may cause the telephone to set up a call unbeknownst to the telephone's owner. The problem is even more pronounced in credit card sized devices, because the slim form of their housing on the one hand makes it natural for the user to put the device in a wallet or pocket, and on the other hand makes the devices susceptible to significant elastic deformation.

Although authentication tokens do not initiate telephone calls, repeated unwanted activation due to false button presses may put an undue burden on the token's battery. The size of the batteries that can be used in a credit card sized device is limited by the size of the device itself, which implies that credit card sized devices have a very limited supply of energy at their disposal. Hence, it is appropriate to avoid any unnecessary energy consumption due to unwanted activation.

Furthermore, in the case of counter-based authentication tokens, false key presses introduce a mismatch between the counter value stored at the central authentication infrastructure and the counter value stored inside the authentication token. This mismatch may render the authentication token inoperable for authentication purposes, if the difference between the two versions of the counter becomes too big to be overcome by the synchronization algorithm.

It is therefore desired to provide a way to avoid activating authentication tokens through false key presses.

A known method to make false activations of pressure-sensitive buttons less likely consists of increasing the pressure required to activate the button in question, a particular method for which is disclosed in Zieder [WO 2008/129193 A (ZIEDER) 2008, Oct. 30]. The disadvantage of this method is that it also renders the normal use of the button less comfortable.

Another known method to make false key presses less likely consists of positioning the button in a depression in the housing such that its upper surface lies in a plane coinciding with or lower than the surface of the housing. One disadvantage of this method is that it also renders the normal use of the button less comfortable. Another disadvantage of this method is that it reduces the travelling distance of the button, which reduces the tactile feedback for the user and which makes it more difficult to construct a highly reliable button. Furthermore, this solution is extremely difficult to implement in very slim devices, such as credit card sized devices.

Yet another known method to make false key presses less likely, used for electronic devices contained in a molded plastic housing, consists of providing a ridge or protrusion in the housing surrounding the button. A disadvantage of this method is that it is difficult to implement when there are constraints on the overall thickness of the device. Another disadvantage of this known method is that it only applies to molded housings, and not to housings produced by stacking or laminating essentially flat surfaces onto each other, as is the case in credit card sized devices.

In the context of mobile telephones, the unintentional dialing problem is typically resolved by providing the telephone with a "locked" state, in which the device is not responsive to any keypresses other than a predefined and documented unlocking combination. This particular solution is not practical in credit card sized authentication tokens. Firstly, the authentication token would have to have a sufficiently great number of keys to support an unlocking combination that is unlikely to be entered unintentionally through false key presses. Secondly, the authentication token would continuously spend battery power—which is a scarce resource—to process all key presses, intentional or unintentional, in order to detect the entering of the unlocking combination.

Technical Solution

The present invention consists of an improvement of the well-known "raised ridge" to protect individual buttons from false key presses. In credit card sized devices, a classical raised ridge is difficult to implement because many stages of the standard manufacturing processes for credit card sized plastic cards and devices embedded in credit card sized plastic cards assume a very uniform thickness and very smooth surface of the card or device, and because a classical raised ridge may lead to a total device thickness that exceeds the applicable standards for credit cards.

Typically, the only deviation of a completely flat surface that is found on credit cards, is the embossing of characters indicating the card holder's name and the card number and expiry date. The step of embossing is typically applied towards the end of the manufacturing process, for example after the graphical design has been applied. The improvement is based on the insight that the embossing technique may be applied to provide a ridge around a button, while remaining within the thickness bounds imposed by credit card size standards and being compatible with the standard manufacturing process for plastic cards such as credit cards.

A known problem with applying embossing to cards containing electronic components, is the fact that the embossing process may damage the components or the wiring inside the card.

The present invention is further based on the insight that an embossed ridge of a judiciously designed shape will avoid such damage. In order not to sever any bonds or wires connecting to the button in question during the embossing process, the embossed ridge is preferably not in a fully closed shape. An interruption in the ridge is provided to allow any wiring connecting the button, enclosed by the ridge, to other electronic components, to remain unharmed by the embossing process. Preferred shapes include a U-shape, or a pair of parentheses or crescents surrounding the button.

The present invention is finally based on the insight that adequate ridge shapes can be obtained by combining standard alphanumerical characters or punctuation signs, such as parentheses. Hence, the invention may be practiced by means of existing embossing machines, for example using symbols already present on the punch and die wheels of such machines.

ADVANTAGEOUS EFFECTS

The apparatus of the present invention has the advantage that false activations can be avoided. This avoids unnecessary battery drain, thus increasing the lifetime of the apparatus.

Furthermore, the present invention avoids unintentional increasing of the event counter in an authentication token according to the present invention, which could cause desynchronization between the authentication token and the associated counter record in the central authentication database, thus reducing the risk of false negatives due to desynchronization in the authentication process.

The present invention uses embossing, a process that is already commonly used in the production of plastic cards, to obtain the additional technical effect described above, thus allowing the invention to be implemented at a very limited additional cost.

BRIEF DESCRIPTION OF THE DRAWINGS

The foregoing and other features and advantages of the invention will be apparent from the following, more particular description of several embodiments of the invention, as illustrated in the accompanying drawings.

MODE(S) FOR CARRYING OUT THE INVENTION

Figure 1A:
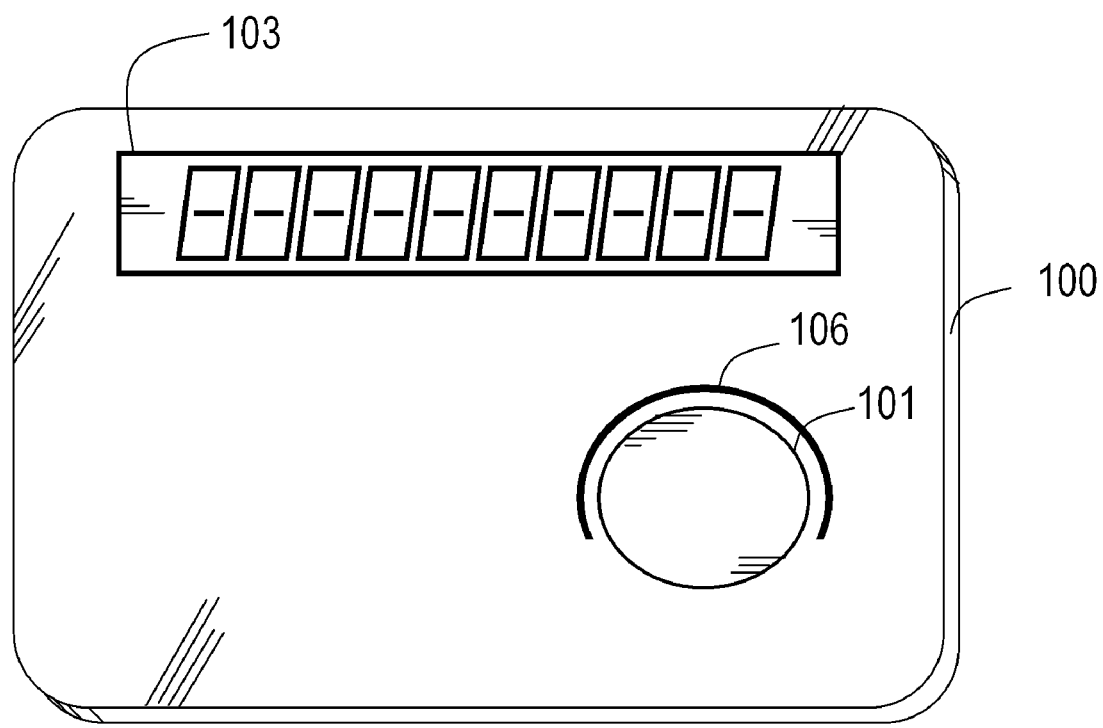
FIG. 1a illustrates an apparatus according to the present invention.
Figure 1B:
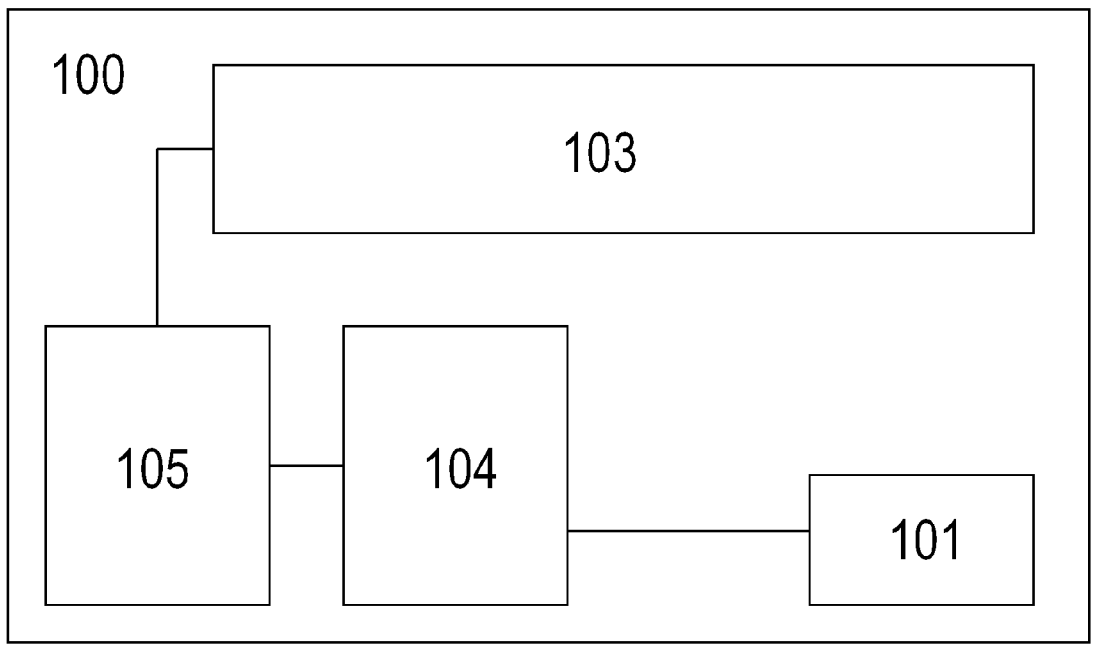
FIG. 1b schematically represents components of an apparatus according to the present invention.
Figure 2:
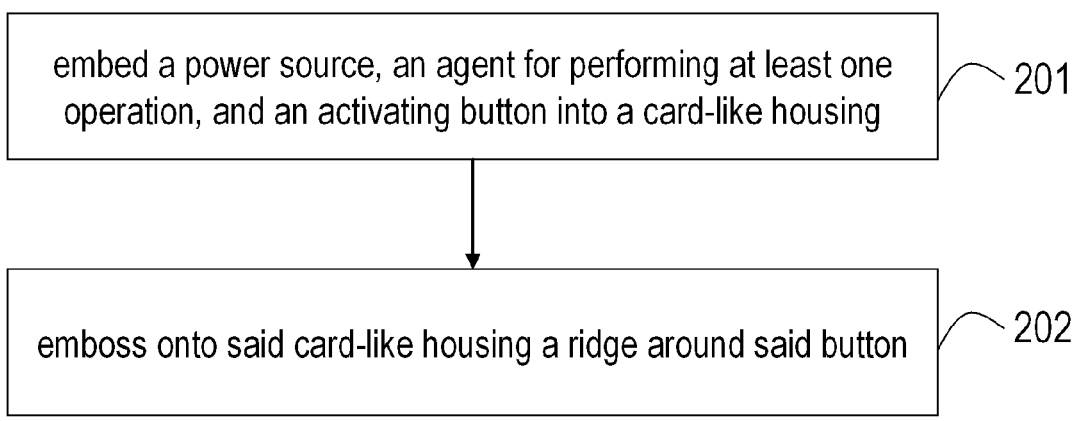
FIG. 2 presents a flow chart of the process according to the present invention.

In a general embodiment, the slim electronic apparatus 100 of the present invention comprises a power source 105, an agent 104 for performing at least one operation, an activation button 101 for initiating said at least one operation by said agent, and an embossed ridge 106 around said button.

In a preferred embodiment, said ridge has at least one interruption, located where a wire or a component of the apparatus is present.

In a preferred embodiment, said apparatus is embedded in a credit card sized plastic.

In one embodiment of the apparatus of the present invention, said ridge has the shape of an interrupted circle. In another embodiment of the apparatus of the present invention, said ridge is U-shaped. In yet another embodiment of the apparatus of the present invention, said ridge consists of at least two unconnected segments.

Figure 1C:
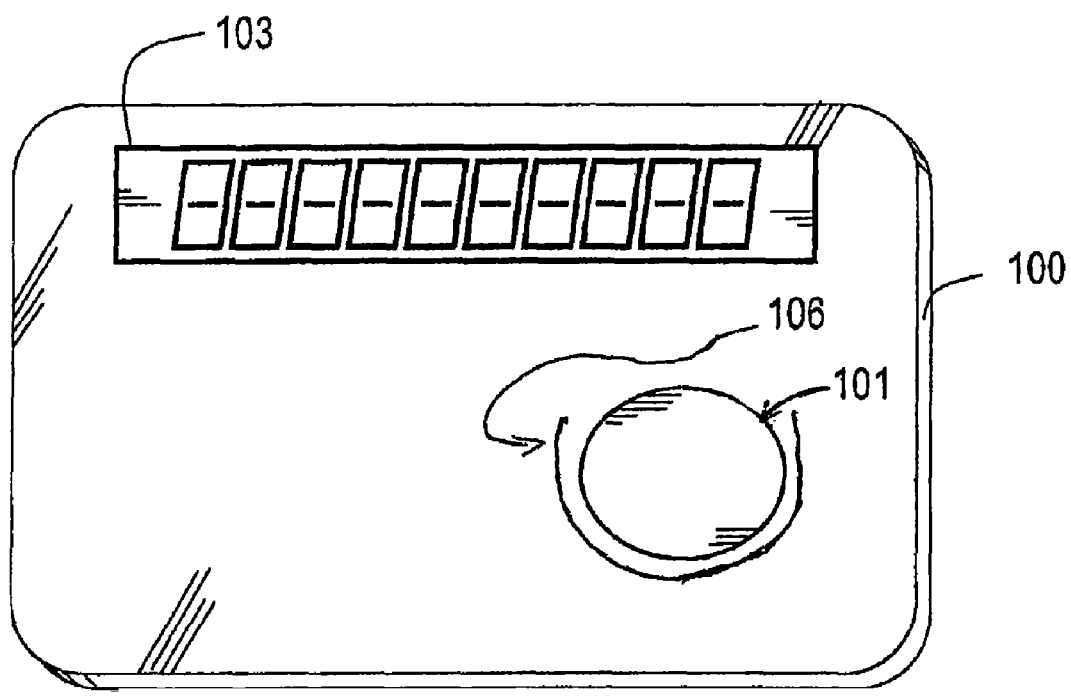
FIG. 1c shows the alphanumerical character ridge "U".
Figure 1D:
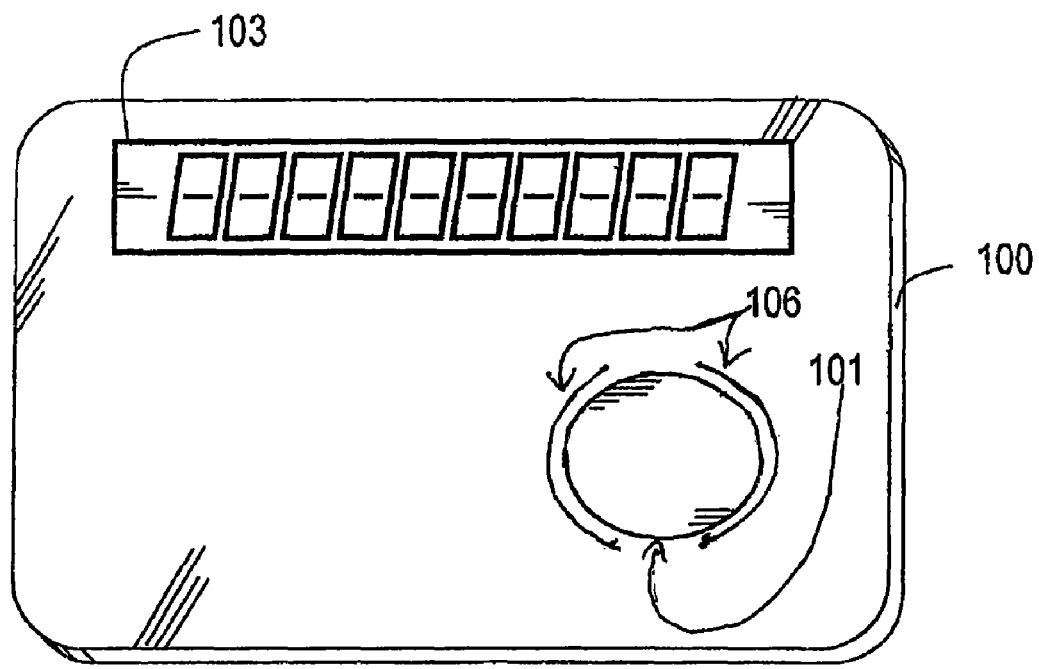
FIG. 1d shows the punctuation mark ridge "( )".

In a further embodiment of the apparatus of the present invention, said ridge is embossed using at least one standard alphanumerical character or punctuation mark. In one particular embodiment of the apparatus of the present invention, said at least one standard alphanumerical character or punctuation mark comprises an opening parenthesis and a closing parenthesis positioned on opposite sides of said button (FIG. 1*d*). In another particular embodiment of the apparatus of the present invention, said at least one standard alphanumerical character or punctuation mark comprises the letter U positioned to contain said button (FIG. 1*c*).

In another embodiment, the apparatus of the present invention further comprises an output interface 103. In a particular embodiment, said at least one operation comprises generating an authentication credential, and said user output interface 103 is adapted to output said authentication credential. In a particular embodiment of the apparatus of the present invention, said output interface 103 is a display, such as an LCD display. In an alternative particular embodiment of the apparatus of the present invention, said output interface 103 generates an audible representation of the credential.

A general embodiment of the process of the present invention for producing a slim electronic apparatus comprises embedding 201 a power source 105, an agent 104 for performing at least one operation, and an activating button 101 for initiating said at least one operation by said agent, into a card-like housing, and embossing 202 onto said card-like housing a ridge 106 around said button.

In a preferred embodiment, said ridge has at least one interruption, located where a wire or a component of the apparatus is present.

In one embodiment of the process of the present invention, said ridge 106 is embossed using at least one standard alphanumerical character or punctuation mark. In one particular embodiment of the process of the present invention, said at least one standard alphanumerical character or punctuation mark comprises an opening parenthesis and a closing parenthesis positioned on opposite sides of said button. In another particular embodiment of the process of the present invention, said at least one standard alphanumerical character or punctuation mark comprises the letter U positioned to contain said button.

In a another embodiment of the process of the present invention, said ridge 106 has the shape of an interrupted circle. In yet another embodiment of the process of the present invention, said ridge is U-shaped. In a further embodiment of the process of the present invention, said ridge consists of at least two unconnected segments.

In another embodiment, the process of the present invention further comprises embedding an output interface 103 into the card-like housing. In a preferred embodiment, said at least one operation comprises generating an authentication credential, and said output interface 103 is adapted to output said authentication credential. In a particular embodiment of the process of the present invention, said output interface 103 is a display, such as an LCD display. In an alternative particular embodiment of the process of the present invention, said output interface 103 is adapted to generate an audible representation of the credential.

While various embodiments of the present invention have been described above, it should be understood that they have been presented by way of example only, and not limitation. Thus, the breadth and scope of the present invention should not be limited by any of the above described exemplary embodiments but should be defined only in accordance with the following claims and their equivalents.

The invention claimed is:

1. A slim electronic apparatus, comprising:
   a power source,
   an agent for performing at least one operation,
   an activation button for initiating said at least one operation by said agent, and
   an embossed ridge around said button,
   wherein the embossed ridge includes an interruption through which the activation button is electrically coupled to the agent.

2. The apparatus of claim 1, wherein said interruption is located where a wire or an electrical component of said apparatus is present.

3. The apparatus of claim 2, wherein said ridge has the shape of an interrupted circle.

4. The apparatus of claim 2, wherein said ridge is U-shaped.

5. The apparatus of claim 2, wherein said ridge consists of at least two unconnected segments.

6. The apparatus of claim 2, wherein said ridge is embossed using at least one standard alphanumerical character or punctuation mark.

7. The apparatus of claim 6, wherein said at least one standard alphanumerical character or punctuation mark comprises an opening parenthesis and a closing parenthesis positioned on opposite sides of said button.

8. The apparatus of claim 6, wherein said at least one standard alphanumerical character or punctuation mark comprises the letter U positioned to contain said button.

9. The apparatus of claim 1, embedded in a credit card sized plastic housing.

10. The apparatus of claim 1, further comprising an output interface.

11. The apparatus of claim 10, wherein said at least one operation comprises generating an authentication credential, and wherein said output interface is adapted to output said authentication credential.

12. A process for producing a slim electronic apparatus, comprising:
   embedding a power source, an agent for performing at least one operation, and an activation button for initiating said at least one operation by said agent, into a card-like housing; and
   embossing onto said card-like housing a ridge around said activation button after embedding said power source, said agent and said activation button into said card-like housing.

13. The process of claim 12, wherein said ridge has at least one interruption, located where a wire or electrical component of said apparatus is present.

14. The process of claim 13, wherein said ridge has the shape of an interrupted circle.

15. The process of claim 13, wherein said ridge is U-shaped.

16. The process of claim 13, wherein said ridge consists of at least two unconnected segments.

17. The process of claim 13, wherein said ridge is embossed using at least one standard alphanumerical character or punctuation mark.

18. The process of claim 17, wherein said at least one standard alphanumerical character or punctuation mark comprises an opening parenthesis and a closing parenthesis positioned on opposite sides of said button.

19. The process of claim 17, wherein said at least one standard alphanumerical character or punctuation mark comprises the letter U positioned to contain said button.

20. The process of claim 12, wherein said card-like housing comprises a credit card sized plastic.

21. The process of claim 12, wherein said embedding additionally comprises embedding an output interface.

22. The process of claim 21, wherein said at least one operation comprises generating an authentication credential, and wherein said output interface is adapted to output said authentication credential.

23. An authentication token embedded in a credit card sized plastic housing comprising:
   a power source,
   an agent adapted to generate an authentication credential,
   an activation button for initiating said generation of said authentication credential by said agent,
   a user output interface adapted to output said authentication credential, and
   an embossed ridge around said activation button,
   wherein said embossed ridge includes an interruption through which said activation button is electrically coupled to the agent.

24. The authentication token of claim 23,
   wherein the user output interface comprises a display for displaying said authentication credential.

25. A process for producing a credit card sized authentication token, comprising:
   embedding into a credit card sized plastic housing:
      a power source,
      an agent for generating an authentication credential,
      an activation button for initiating said generation of said authentication credential by said agent, and
      a user output interface adapted to output said authentication credential; and
   embossing onto said credit card sized plastic housing, a ridge around said activation button after embedding said power source, said agent, said output interface and said activation button into said credit card sized plastic housing.

26. The process of claim 25,
   wherein the user output interface comprises a display for displaying said authentication credential.

* * * * *